(12) United States Patent
Bist

(10) Patent No.: US 9,026,476 B2
(45) Date of Patent: May 5, 2015

(54) SYSTEM AND METHOD FOR PERSONALIZED MEDIA RATING AND RELATED EMOTIONAL PROFILE ANALYTICS

(76) Inventor: Anurag Bist, Newport Beach, CA (US)

(*) Notice: Subject to any disclaimer, the term of this patent is extended or adjusted under 35 U.S.C. 154(b) by 577 days.

(21) Appl. No.: 13/291,057

(22) Filed: Nov. 7, 2011

(65) Prior Publication Data

US 2012/0290508 A1 Nov. 15, 2012

Related U.S. Application Data

(60) Provisional application No. 61/483,878, filed on May 9, 2011, provisional application No. 61/505,669, filed on Jul. 8, 2011.

(51) Int. Cl.

| | | |
|---|---|---|
| G06E 1/00 | (2006.01) | |
| G06E 3/00 | (2006.01) | |
| G06F 15/00 | (2006.01) | |
| G06G 7/00 | (2006.01) | |
| G06N 99/00 | (2010.01) | |
| G06N 5/04 | (2006.01) | |
| G06F 17/30 | (2006.01) | |

(52) U.S. Cl.
CPC ............ *G06N 5/04* (2013.01); *G06N 99/005* (2013.01); *G06F 17/30035* (2013.01); *G06F 17/30038* (2013.01)

(58) Field of Classification Search
None
See application file for complete search history.

(56) References Cited

U.S. PATENT DOCUMENTS

| | | | |
|---|---|---|---|
| 2002/0174425 A1 | 11/2002 | Markel | |
| 2003/0154180 A1* | 8/2003 | Case et al. | 707/1 |
| 2006/0085419 A1* | 4/2006 | Rosen | 707/9 |
| 2008/0097822 A1* | 4/2008 | Schigel et al. | 705/10 |
| 2008/0133716 A1* | 6/2008 | Rao et al. | 709/220 |
| 2009/0012925 A1* | 1/2009 | Brown | 706/46 |
| 2010/0049534 A1* | 2/2010 | Whitnah et al. | 705/1 |
| 2010/0082751 A1 | 4/2010 | Meijer | |
| 2010/0107075 A1* | 4/2010 | Hawthorne et al. | 715/708 |
| 2010/0138491 A1* | 6/2010 | Churchill et al. | 709/204 |
| 2010/0144440 A1* | 6/2010 | Arrasvuori et al. | 463/42 |
| 2010/0153983 A1 | 6/2010 | Philmon | |
| 2011/0225043 A1* | 9/2011 | Bhatia et al. | 705/14.53 |
| 2011/0264531 A1* | 10/2011 | Bhatia et al. | 705/14.66 |
| 2011/0321175 A1* | 12/2011 | Slater | 726/28 |
| 2012/0222057 A1 | 8/2012 | Sadowsky | |
| 2012/0222058 A1 | 8/2012 | Kaliouby | |
| 2012/0265811 A1 | 10/2012 | Bist | |
| 2013/0014141 A1 | 1/2013 | Bhatia | |
| 2013/0117375 A1 | 5/2013 | Bist | |
| 2013/0288212 A1 | 10/2013 | Bist | |

* cited by examiner

*Primary Examiner* — Kakali Chaki
*Assistant Examiner* — Luis Sitiriche
(74) *Attorney, Agent, or Firm* — Henry J. Cittone; Cittone & Chinta LLP

(57) ABSTRACT

A system and a method for generating an emotional profile of the user and deriving inference from the analytics of generated emotional profile is provided. The method involves sharing media content or online event in a connected environment; capturing user's reaction to the said content or event; generating an emotional score of the user to rate the media content or event; and sharing the emotional score within the connected environment.

20 Claims, 8 Drawing Sheets

SYSTEM AND METHOD FOR PERSONALIZED MEDIA RATING AND RELATED EMOTIONAL PROFILE ANALYTICS

CROSS REFERENCE TO RELATED APPLICATIONS

This application claims the benefit of provisional patent application number U.S. 61/483,878 titled "Personalized Media Rating System", filed May 17, 2011, and U.S. 61/505, 669 titled "Emotional Profile Analytics", filed Jul. 8, 2011 in the United States Patent and Trademark Office, the disclosure of each of which is incorporated herein by reference in its entirety.

FIELD OF THE INVENTION

The present invention relates generally to system and method for developing interactive real time online user's profiles, and more particularly, to a system and method for deriving inference from analytics of personalized emotional profiles.

BACKGROUND OF THE INVENTION

With the growth of connected infrastructure, more and more human interactions are happening online through instant messaging, real time interactions on online social communities, or interactions facilitated with next general mobile and connected devices that include smart phones, internet tablets, gaming consoles, and more traditional laptops and computer terminals. One key aspect of these interactions is the ability to accurately convey an individual's emotions during such online interactions.

Currently such emotions are being conveyed by individuals in a deliberate manner by text or other visual cues. There even exist methods for automatically detecting individual emotions based on a variety of sensory, auditory and visual inputs.

However, the currently known technologies do not provide a solution that addresses a uniform method of conveying an individual's emotions in a connected environment that can be scaled across a number of online social interactions.

Furthermore, there doesn't exist a system or method that could capture, normalize and share an instant reaction of an individual ("Emotional State") as a result of viewing or consuming content that is shared among a large number of users.

In light of above, a method and a system is presented that can detect instant and time averaged "Emotional Scores" or "Emotional Profiles" of individuals who are viewing or watching content that is shared in a connected environment. Furthermore, the method and the system can be used to create a personalized emotional profile of an individual, using a subset of this personalized emotional profile to represent the individual's behavior during a specific application, and to derive prediction and analytics by combining this with the individual's instantaneous behavior in the given application.

OBJECTS OF THE INVENTION

It is a primary object of the invention to provide a system for rating shared media or content in a social group or among a set of shared users.

It is a further object of the invention to provide methods for rating shared media or content in a social group or among a set of shared users.

It is still a further object of the invention to provide a method for detecting instant and time averaged "Emotional Scores" or "Emotional Profiles" of individuals who are viewing or watching a particular content that is shared in a connected environment.

A further and related object of the invention is to provide a system to share the Emotional score within a connected group of users as selected by the individual.

It is still a further object of the invention to provide a system to create a personalized emotional profile of an individual.

A further and related object of the invention is to provide a method for using a subset of the personalized emotional profile to represent the individual's behavior during a specific application, and deriving prediction and analytics by combining this with the individual's instantaneous behavior in the given application.

BRIEF SUMMARY OF THE INVENTION

In view of the foregoing limitations, associated with the use of traditional technology, a method and a system is presented deriving inference from analytics of personalized emotional profiles.

Accordingly, in an aspect of the present invention, a system for generating an emotional profile of the user and deriving inference from the analytics of profile is provided. The system provides a client device having a detector to capture user's input; an interface allowing user to interact with online events or content; a module to collect the emotional footprint of the user to generate an emotional score corresponding to the events or content; a central repository to store the emotional score of associated content or event; and a server configured with a plurality of client devices in the network to communicate the emotional score in the network.

In another aspect of present invention, a method for rating and sharing user's emotional reaction for content and media in a connected environment is provided. The method provides sharing or distributing online content or media pieces over a connected network of client devices; capturing user input in the form of the user's reaction to the content or events and changes in the user's reaction to the content or events; processing the input to generate an emotional score associated with the user as well as the content or media; communicating the emotional score to a database in a network (for example a cloud computing network); providing meta-data to the content or the media piece mapped to this emotional score; and sharing the emotional score related to the content or media within the user's network.

The method comprises of an interface that enables users to interact with each other in a connected on-line infrastructure; capturing data on user behavior during the interaction; creating a baseline profile representing average emotional behavior of the user in reaction to all possible events; capturing an instantaneous reaction of the user in a response to an online event; comparing the instantaneous reaction of a user with the baseline profile; and predicting the deviation of the user's reaction with the normalized reaction of the user.

BRIEF DESCRIPTION OF THE DRAWINGS

The invention will hereinafter be described in conjunction with the figures provided herein to further illustrate various non-limiting embodiments of the invention, wherein like designations denote like elements, and in which.

DETAILED DESCRIPTION OF INVENTION

Figure 1:
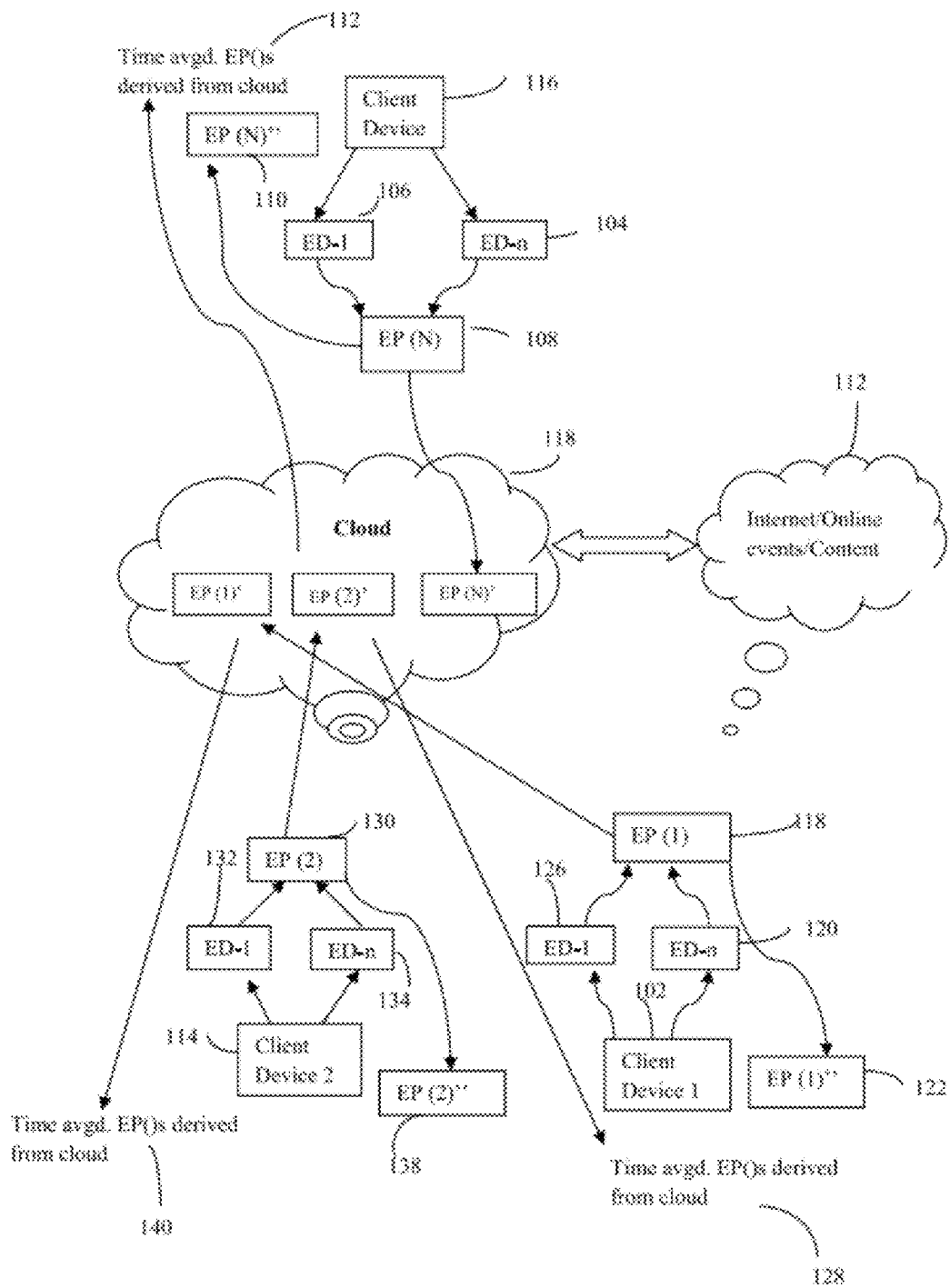
FIG. 1 illustrates a schematic representation of interacting system for capturing Emotional Profile of the individual in a connected on-line infrastructure, in accordance with an embodiment of the present invention.

In the following detailed description of embodiments of the invention, numerous specific details are set forth in order to provide a thorough understanding of the embodiments of invention. However, it will be obvious to a person skilled in art that the embodiments of invention may be practiced with or without these specific details. In other instances methods, procedures and components known to persons of ordinary skill in the art have not been described in detail so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

The present invention provides a system and methods used thereof for detecting instant and time averaged "Emotional Scores" or "Emotional Profiles" of individuals who are viewing or watching content or are taking part in an event that is shared in a connected environment (e.g. media content over internet, or shared media repositories, or a web conference). The system consists both of a client sub-system as well as a server sub-system that enable detection of "Emotional Scores" of individual as a reaction of shared content viewing, normalization of score, and an ability to share the emotional score within a connected group of users who are selected by the individual. The Emotional Profile or Score is a combination of the emotion, behavior, response, attention span, gestures, hand and head movement, or other reactions or stimuli of the user collected through the sensors available in the client devices and then processed. In an aspect of the invention the shared Emotional Profiles may be used to create a personalized emotional profile to represent the individual's behavior during a specific application, and deriving prediction and analytics by combining this with the individual's instantaneous behavior in the given application.

The present invention extends the concept of "Emotional Profiles" or "Emotional Scores" for a specific application: rating and sharing emotional reaction or behavior of individuals or groups in response to watching or viewing content or media that has been stored to be viewed in a connected environment. The invention provides a generic system and a method of rating shared media or content in a social group or among a set of shared users. The method may be used in any kind of content sharing environment. The basic premise of the method is to use any and all available sensors to track and detect user or viewer's emotional behavior, emotional state, or emotional change, upon viewing the particular content.

In an embodiment of the present invention, the sensors or detectors include, but are not limited to, facial expression detections, smile detector, voice intonations, tactile sensors, breath analysis, pulse detections, voice analysis, etc. After detecting the emotional state of the user, the emotional state is categorized or given a score, and this information is then shared to the set of allowed individuals as selected by the user. The granularity of detection and scoring would be varied based on categorization of the content, or by the user's privacy choices. Furthermore, the number of segments or scores given to the same content may also change depending on the kind of content, the user preference, or depending on the application. After the generation of "Emotional Score" for a particular content, the score is then shared to everyone, or a select number of allowed individuals, applications, or networks related to the user.

In an embodiment of the present invention the "Emotional Score" has high correlation to the actual Emotional Reaction of the user and is normalized by the individual extremes of emotions displayed by the individual, thereby creating a metric that has meaning for a large number of users.

FIG. 1 illustrates a schematic representation of a system and method for capturing instantaneous and time averaged "Emotional Scores" or "Emotional Profiles" of individuals in a connected network in accordance with an embodiment of the present invention. The system has the ability to capture Emotional Profiles of different users (P(1), P2 ... P(N)), connected with each other through respective client devices: client device 1 102, client device 2 114, and client device N 116 in a networked environment. The client devices 102, 114 and 116 are configured with a server in the cloud network 118. Various online events and content 112 are available for interaction in the cloud network 118, to different users through their respective client devices 102, 114 and 116. The client devices have a module that has an inherent ability to continuously capture some critical auditory, visual, or sensory inputs from the individuals. This module is a functionality that could be a combination of the available sensors in the client device (camera/webcam, microphone, other sensors like tactile/haptic etc.) and the available processing modules present in the client devices. The client devices 102, 114 and 116 capture these inputs as they change in response to the individual's reaction to viewing of some on-line content or media piece that is part of a connected media repository in the cloud network 118. After capturing the inputs by the sensors present in the client device 116, the client device 116 then use their processing power to use one or more Emotional Detectors available (ED(1) ... ED (n)) 104, 106 to finally generate an instantaneous "Emotional score" or "Emotional Profile" 208 that is associated with both the individual and the on-line content or media piece that the individual just watched. The client device then communicate this "Emotional Score" to a shared repository or a central database in the "cloud" 118 that connects the different users through their client devices 102, 114 and 116. Alternatively, the client devices need not generate and send Emotional Profiles or Emotional Scores to the cloud or server, and may instead transmit data (e.g. the user response) to one or more servers which process said data to create the Emotional Profiles or Emotional Scores. The cloud 118 stores the evolving set of emotional profiles of the individuals (EP (1)', EP (2)', .... EP(N)') at a given time. This set of emotional profiles is translated or mapped to the individual client devices into a fixed mapping (EP(1)''', EP(2)''', .... EP(N)''')212. The "Emotional Score" is converted to a unique 'meta-data' that links it to the user, time watched, and the content that was watched.

In an embodiment of the present invention the client device 102 comprises of a single module or a plurality of modules to capture the input data from the individual, to process the input data for feature extraction and a decision phase for generating the profile of the user. Some examples of these input modules may be webcams, voice recorders, tactile sensors, haptic sensors, and any other kind of sensory modules.

In another embodiment of the present invention, the client device 102 includes but is not limited to being a mobile phone, a smartphone, a laptop, a camera with WiFi connectivity, a desktop, tablets (iPAD or iPAD like devices), connected desktops or other sensory devices with connectivity.

In another embodiment of the present invention, the profile corresponds to the emotion, behavior, response, reaction or other stimuli of the user.

In another embodiment of the present invention, the instantaneous emotional profile (EP(n))208 detection could be modulated by the Emotional Profile (EP(n)') in the cloud 118 as well.

In another embodiment of the present invention, the Emotional Profile EP (n) 208 is also simultaneously communicated to a central repository in the cloud 118 that may be residing in a geographically different place and is connected to a plurality of other client devices.

In another embodiment of the present invention, the Emotional Profile of the user is stored in a different format EP(n)' and is updated continuously as time evolves. EP(n)' is the Emotional Profile of the individual "N" that is stored in the cloud 118. This profile EP(n)' is used as a base profile in the connected network to communicate the Emotional state of the individual.

The client device 116 stores a different instantaneous version of its own individual emotional profile EP(n)'' 210. Since each client device may have different hardware and software configuration and capacity, therefore each client may store a different version (or format) of emotional profile.

Figure 2:
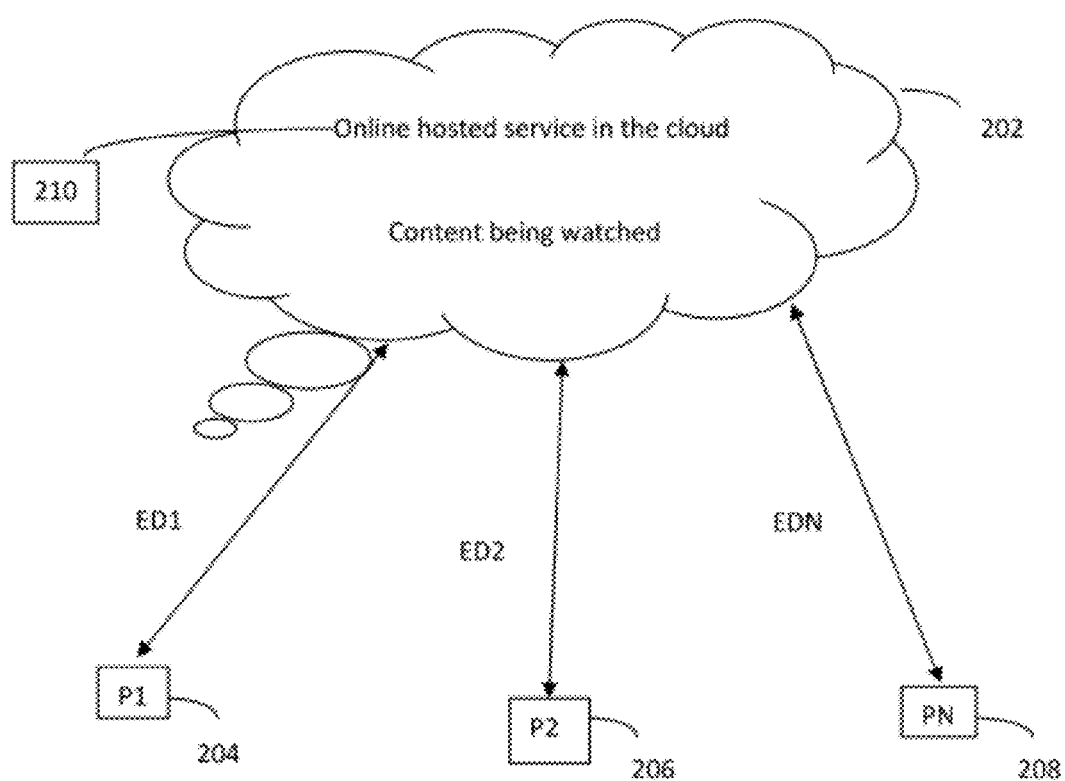
FIG. 2 illustrates an emotional score measuring system in accordance with an embodiment of the present invention.

FIG. 2 illustrates an emotional score measuring system in accordance with an embodiment of the present invention. The system comprises of a server 210 in a cloud network 202 connected to multiplicity of users P1 204, P2 206 and P3 208 through their respective client devices. The server 210 has an ability to maintain a network of users to provide an online hosted service and to track their Emotional state or Emotional Score related to an event that is defined as a user watching a particular content. The server 210 interacts with the client devices in a real time manner and provides a software infrastructure for registering users, giving new users ability to select their social groups, their privacy setting, and their "Emotional Score" profile settings, among other parameters. The users may view and access the content and media in the cloud network 202 and link their emotional score of the content they watch through Application Programming Interfaces (APIs) present in the server 210. When a user watches a particular content or media in the cloud network, the client device captures various kinds of auditory, visual, location based, text based, sensory and other kinds of inputs and generates an instantaneous emotional scores corresponding to the particular content or media. The server 210 records the client generated "Emotional Score" and associates it with the user, along with the metadata or unique network representation (e.g. URL, tiny URL etc.) of the content. The Emotional score is then shared as a meta data that contains information such as the user, the time of watching of the content, the content itself, and is tagged to both the user and the content. This Emotional Score, in various forms, may then be shared in the user's profile in the cloud network. Similarly the content's Emotional Score as a result of a single user's input, or a large set of users' input may also be shared in the cloud network.

In an embodiment of the present invention, the "Emotional Scores" are stored in the central database that connects different users; the Emotional scores are then shared to the allowed set of connected individuals in the user's network. The "Emotional Score" takes into account the variations in individual's emotional reactions and has an option to normalize each score with respect to a time-averaged emotional profile of the individual.

Figure 3:
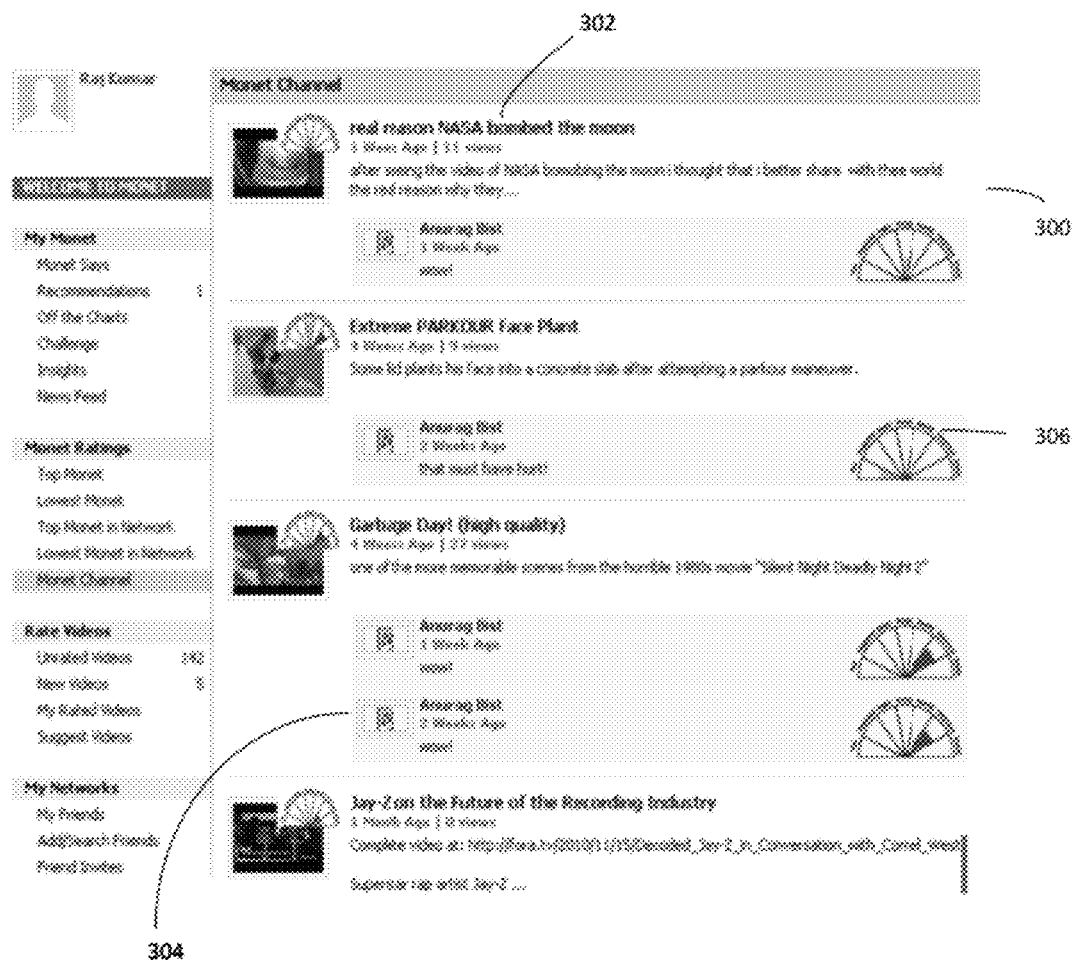
FIG. 3 illustrates a user interface showing the user's emotional reaction to media content in accordance with an embodiment of the present invention.

FIG. 3 illustrates a user interface showing the user's emotional reaction to media content in accordance with an embodiment of the present invention. The user interface 300 shows the details of information generated when media content is watched by a user in an embodiment of the present invention. The information is used as metadata that could be tagged to both the user and the media content and it contains various parameters such as the user, the time of watching the content and the user's rating or emotional score on watching the media content. The interface 300 has a region 302 that includes the details of the video or media content being watched by the user along with the description of video or media content. The region 304 provides details of the user, the time of watching the media content. The region 304 further shows the user's comment in form of textual input; whereby it connotes the textual rating and comment of the user. Another region is also present in the user interface 300, which describes the emotional score of the user after watching the content. The score is shown in form of a D graph 306 that is segmented in various emotional states with intensity range. The segmented emotional states of the D graph 306 include mood of the user such as happy, normal, sad, angry, surprised, disgusted, fearful etc. The D graph 306 provides the emotional score of the user to the content being watched. The Emotional Score segments have an intensity range associated with them, whereby the intensity range may be a decimal number between 0-5. This emotional score could be generated either by the user's inputs, or by automatic Emotional Detector modules present in the user's client devices, or by a combination of these techniques. The actual representation of the emotional score could be in various forms that could be averaged over time, or by the number of ratings by different users.

In an embodiment of the present invention, the scales or the metrics of "Emotional Scores" vary depending upon the kind of content that is being viewed. The granularity of "Emotional Scores" (the ratings or the parameters covered) may also vary depending on the use of these "Emotional Scores" based on specific application being targeted, or the choice of the user (Privacy Settings) to expose the extent of his/her "Emotional State". A given content may have a set of "Emotional Scores" (for example, a 2 min. video clip may end up having 4 or 5 "Emotional Scores" that are uniformly tagged temporally) if the application so desires.

In an embodiment of the present invention, the application may be used in a media repository rating system. The user gets registered with the hosted service and selects their friends in the network to whom they want to interact with. The users also select the range of their Emotional Profiles that connotes the emotional states that could be allowed for depiction in the user's profile. For example, one Emotional Profile could be: {Happy, Normal, Sad}; another, more granular or detailed Emotional Profile could be: {Happy, Normal, Sad, Angry, Surprised, Disgusted, Fearful} etc.

In another embodiment of the present invention, the emotional categories have an intensity range associated with it. The emotional intensity may be a decimal number between 0-5. For instance, Happy 3.4 denotes a person's emotional state of "Happy" with an intensity of 3.4. The user is then allowed to "rate" content from the media repository and as the user rates the content, the content is then tagged with the user's reaction or Emotional Score, or Emotional Profile. In another embodiment of the present invention, this rating happens automatically by the available Emotional Detectors in the user's client device. As more and more user's rate a particular content, different users reactions would be continuously tagged to the content. In this manner the media repository would have an enriched and tagged metadata associated with all content in the library. This tagged data may then be used to derive useful predictions and recommendations for the users of the service.

Figure 4:
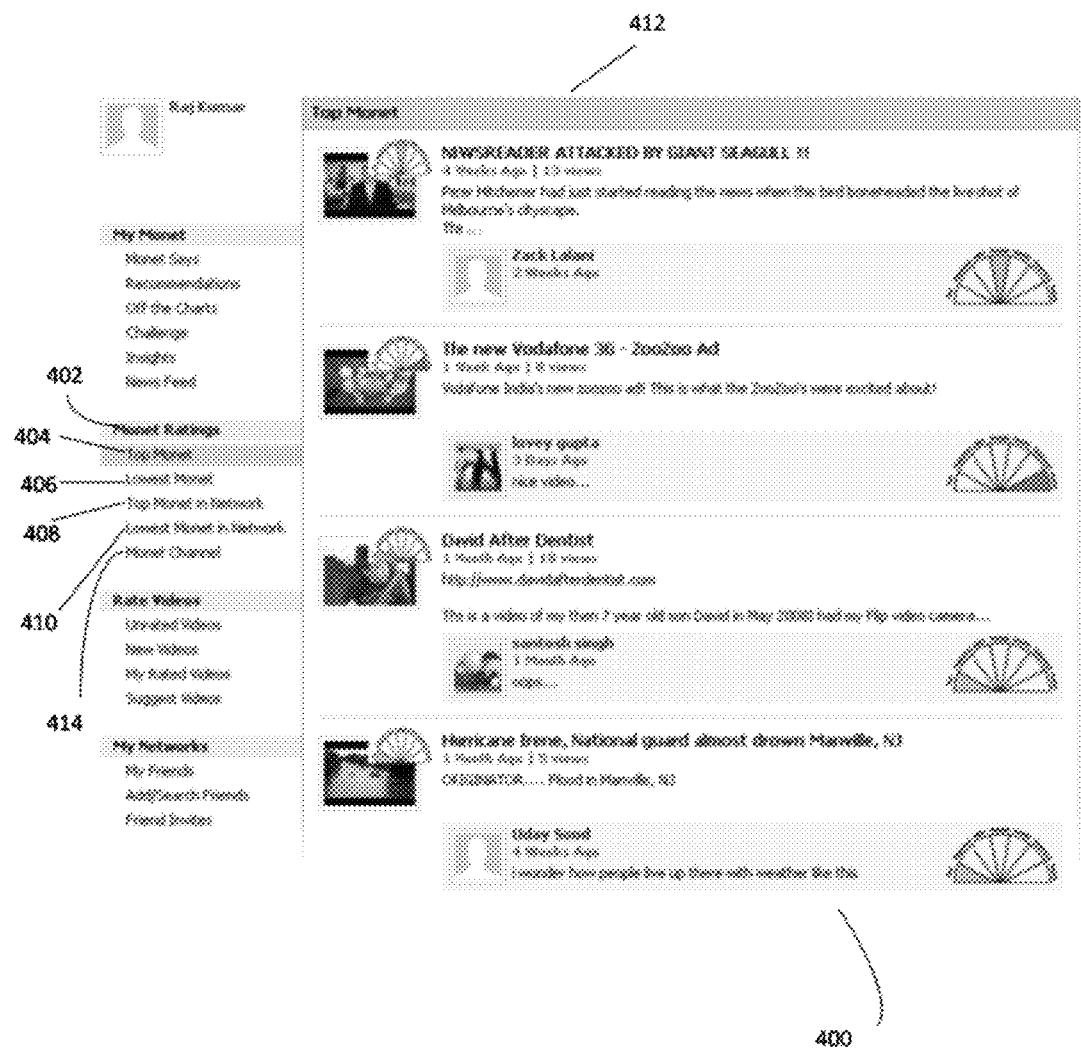
FIG. 4 illustrates an interface showing the rated video content in accordance with an embodiment of the present invention.

FIG. 4 illustrates an interface showing the rated video content in accordance with an embodiment of the present invention. The interface 400 consists of rating section 402 that provides the list of rated videos or media content in the user's network along with different users' comments. The rating section 402 is further segmented in various subsections: top rated videos 404, lowest rated videos 406, top rated videos in user's network 408, lowest rated videos content in the user's network 410, and a section defined as Monet channel 414 that lists all rating activity of the available content. These sub sections provide the list of videos that have been rated high or low in user's network or in the overall network. The interface 400 consists of a list 412 that represents the list of each subsection of rating section 402. The list 412 comprises of the details of videos that have been watched, the comments of the users and the D graph depicting the emotions of different users with a defined intensity.

Figure 5:
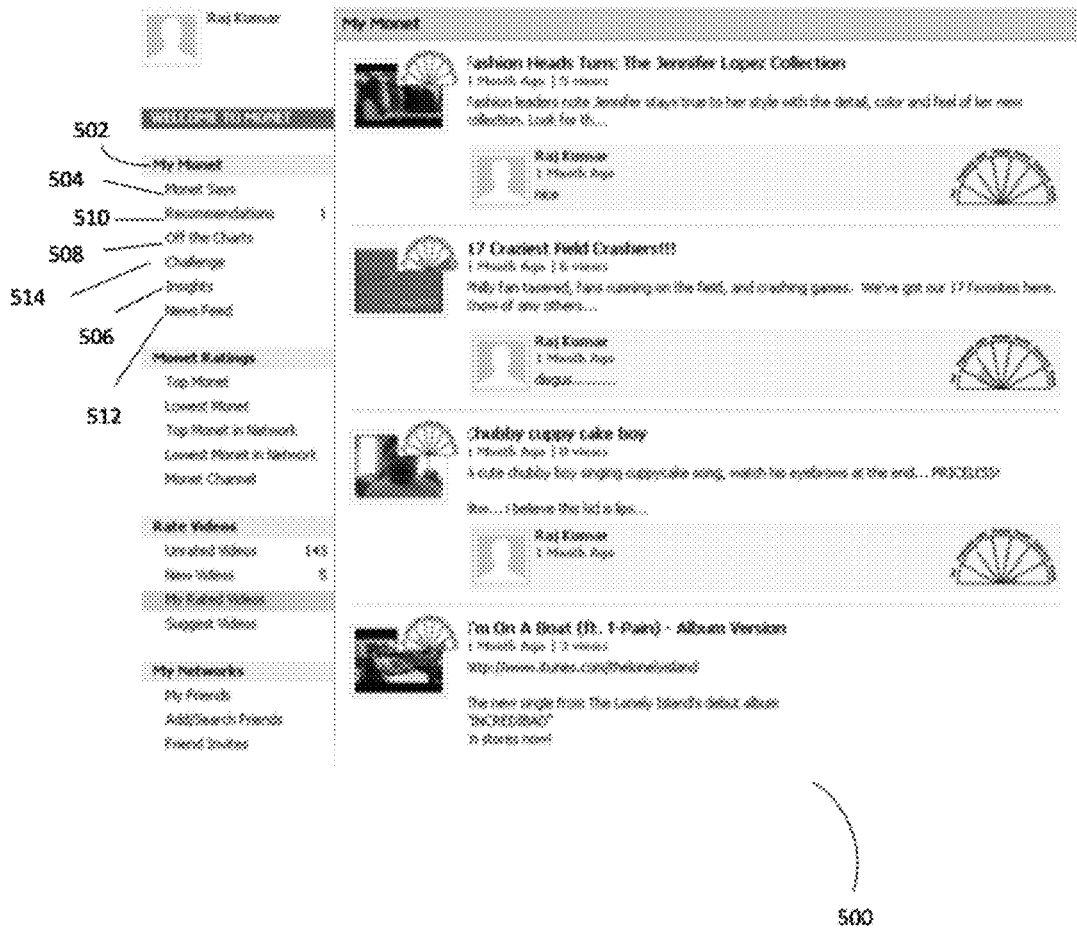
FIG. 5 illustrates an interface showing the user's profile in accordance with an embodiment of the present invention.

FIG. 5 illustrates an interface showing the user's profile in accordance with an embodiment of the present invention. The interface page 500 displays the user's profile 502 showing the user's activity in relation to the online media content or videos, i.e. videos that have been watched by the user, what ratings were given, insights derived about the user from the rated videos, and various others features such as recommendations and news feeds. The user's profile 502 is further segmented in various sub-sections: my ratings 504, insights 506, off the chart 508, recommendations 510, news feed 512 and challenge 514. The sub-section my rating 504 contains list of all the user's rated videos along with the comments of the user and a D graph showing the emotional intensity of the user's reactions. The subsection insights 506 provides a detailed analysis of user behavior with respect to all videos or media content. The sub-section off the chart 508 shows videos that have been rated with the most extreme intensity. The subsection recommendations 510 provides the user with recommendations to watch a particular video or media content based on the analytics derived from data collected about the user and his network. The subsection news feed 512 provides the user information on the other users' activities that are connected in his network. The user's profile section 502 also has a subsection challenge 514 that provides the user to create an activity with friends in the user's network. In one embodiment of this challenge, the user may select a media content and predict the friend's emotional score with respect to the selected media content. After predicting the emotional score, the user may challenge the friend by asking him to rate the content, by inviting him to see the video or media content. In this manner an activity may be created within a user's network to challenge other friends in the network. In another embodiment of this challenge the media selected could be generated by the user himself, and the challenge could be created for a selected number of friends in the user's network.

In an embodiment of the present invention the recommendations depend on a number of metrics and scores that include, but are not limited to: (i) individual's reactions, or Emotional Scores to a particular category of content, (ii) individual's network or friend's reactions or Emotional Scores to a particular category of content, (iii) an aggregate reaction or Emotional Score of a particular demography among the user's of the service, (iv) reaction or Emotional Score of all user's of the service, (v) the instantaneous or most dominant recent Emotional Profile of the user, or (vi) a combination of some or all of the above analytics.

Figure 6:
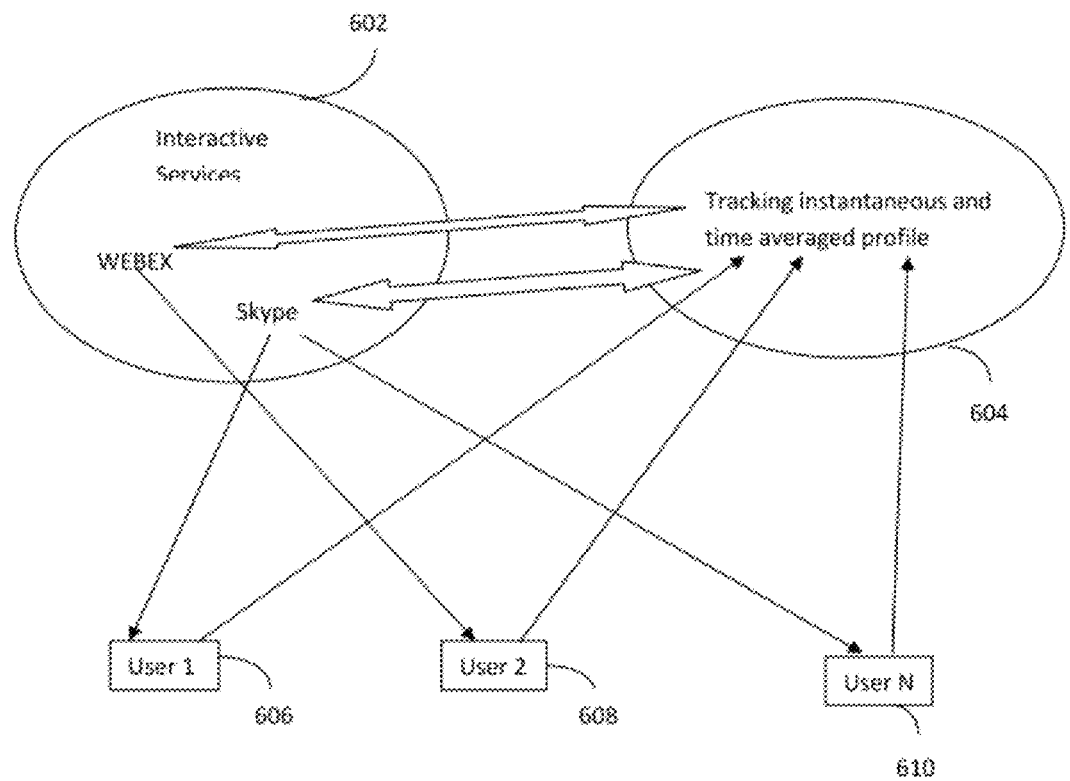
FIG. 6 illustrates the application of Personalized Emotional profiles in an online event and deriving inference from analytics of personalized emotional profile in accordance with an embodiment of the present invention.

FIG. 6 illustrates the application of a Personalized Emotional profiles in an online event and deriving inference from analytics of the personalized emotional profile in accordance with an embodiment of the present invention. The figure illustrates a user using a web-based video conferencing application 602 during the course of a day. The Examples of the web-based services include but is not limited to applications like WebEx, GoToMeeting, or Skype. While the user is attending the web conferencing 602, the cloud based service 604 for Emotional Profile Tracking collects the data of the behavior of the individual. The data corresponding to the behavior of users include voice, video, haptic, tactile, or any other kind of sensory data that is being captured for the user while the user is using the Web conferencing application. The cloud based service then builds a unique Emotional Profile (EP) of the individual based on the continuous collection of data during various conversations or interactions that the user has over a course of time. The cloud based service then creates a representation of the user 'baseline profile'(BP) that in some sense represents average emotional behavior of the individual in reaction to all possible 'events' that the user may come across. The 'events' may be on-line conversations, reactions of the user to an on-line Advertisement or on-line videos, etc. The 'baseline profile' (BP) is then used to calculate deviations from the average behavior of the individual during a course of a conversation, or to predict the behavior of the individual to an incoming online event based on some prior knowledge of the event and the 'baseline profile' (BP), or to derive any similar analytics.

In an exemplary embodiment of the present invention, the analysis of personalized emotional profile may be used to predict self behavior, improve his/her conversation skills, improve his/her meeting behavior skills etc. For instance if the user uses the web conferencing services repeatedly over a course of time and the user opts in for the cloud service related to tracking emotional profiles, than during each instantiation (or conversation) the service collects inputs of voice, video, haptic, tactile, or other sensory data from the user and uses this to build or evolve the user's emotional profile (EP). Over the course of time there is a baseline profile (BP) of user generated that represents the nominal or average behavior of the user during the course of using this application. Once the Emotional Profile (EP) and/or the Baseline Profile (BP) are built, then for every new conversation, the Cloud Service is able to record and tag any deviations from the baseline profile.

At the end of each user web conferencing conversation the service prompts the user to see the places where his/her EP varied from BP. This would be an indication of places where the user behaved in a manner that was deviated from his/her nominal behavior (angry, excited, agitated, sad etc.). The user may see the places of deviation from his BP, by opting the cloud service to bring in the EP scores, deviations from the BP, and the corresponding tagged video/audio segments of specified durations (say, 5-10 seconds videos, where the overall conversation could have been an hour).

In an embodiment of the present invention, the presentation of this information to the user take any of the popular methods that include but are not limited to a pop-up window with visuals, a pop-up window with graphical depiction of the user profile and a method to represent the user Emotional Score (rating), or any other method known to present such analytics in visual, graphical or numerical form. The user may use the information to correct his/her self behavior, improve his/her conversation skills, improve his/her meeting behavior skills etc.

Figure 7:
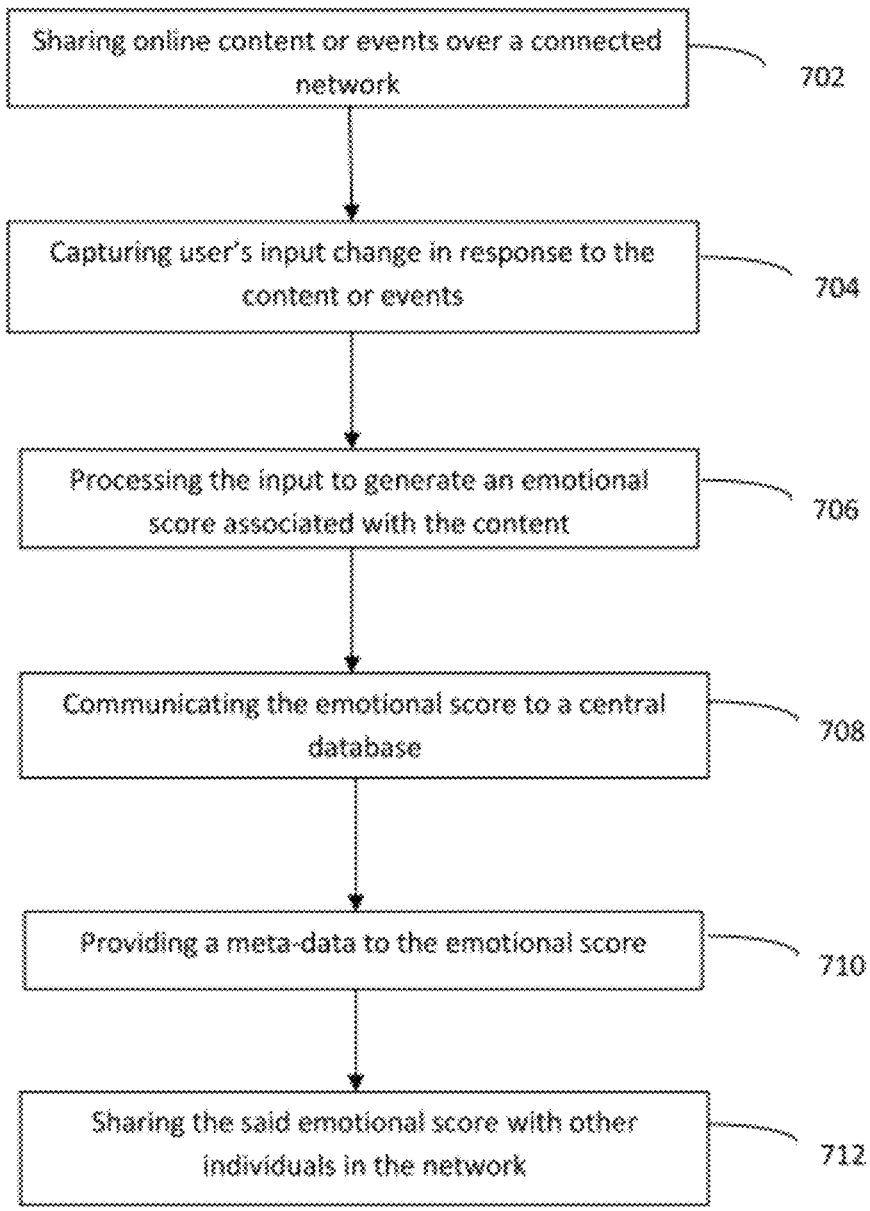
FIG. 7 illustrates a flow diagram depicting a process flow for rating media content and sharing individual's emotional reaction over the connected network, in accordance with an embodiment of the present invention.

FIG. 7 illustrates a flow diagram depicting a process flow for rating media content and sharing individual's emotional reaction over the connected network, in accordance with an embodiment of the present invention. In an embodiment, the method includes the following steps: Step 702: various online content and media are distributed among the users in a connected environment through online hosted service present in the cloud network. The distribution of online content and media is done through a server present in the cloud network. The connected users have an access to view these content and media. Step 704: while viewing the content or media the user leaves an emotional footprint of their reaction to the particular content or media being watched. These are in form of change in reaction of the user during the course of content or media. These changes in reaction of the user corresponding to the content or media are captured by the client device in form of inputs. The captured inputs include but are not being limited to voice, video, haptic, tactile, or any other kind of sensory data. Step 706: the client device processes the captured inputs and generates an instantaneous and time averaged emotional score of the user. The "Emotional Score" may be a set of values for different segment of the content, or it may be an overall value averaged for the whole length of the content.

The generated "Emotional Score" is recorded and is associated with the user, along with the metadata or unique network representation (e.g. URL, tiny URL etc.) of the content. Step 708: the time averaged Emotional score and the instantaneous "Emotional Score" associated with viewing a particular content is then communicated to the Server in the Cloud network where it is stored. Step 710: the generated Emotional Score is stored as a meta data that links it to the user, the content watched and the time stamp of the content being watched. Step 712: the "Emotional Score" available in the central repository is then shared to the allowed set of connected individuals in the user's network. The "Emotional Score" could also take into account the variations in individual's emotional reaction and would have an option to normalize each score with respect to a time-averaged emotional profile of an individual.

In an exemplary embodiment of the present invention, the method of present invention may be used to rate the media content in connected media repository such as You Tube video or other online content. When the user watches the You Tube video or other online content or some connected media repository, the client device records the "Emotional Score" of the individual during the time that particular content is being watched. In the most generic implementation the client device uses the available sensors (visual/facial expressions/smile/eye tracking etc.), auditory (voice intonation changes, voice recognition etc.), sensory, tactile etc.) to detect the time averaged or segmented "Emotional Score" associated with watching the particular content. The generated "Emotional Score" is transferred and updated at the server to the user's profile in the hosted service for others to see. The "Emotional Score" has an associated 'meta-data' that has information about the content, the user, the time it was watched, any category of content, if easily available, etc. The "Emotional Score" may then be listed in the user's profile and may be demonstrated in various ways. There could be ways that this information could be available as APIs to other applications and could be linked to other places where the user finds relevant and allows it to be used.

In the simplest/first implementation, the "Emotional Score" may be manually entered by the user upon watching the content. This "Emotional Score" may be represented as a 'meta-data' that contains the "tiny URL" of the content/You Tube video, the user identification tag, any associated thumbnail, the time of viewing, or any other description that may help represent the "Emotional Score" in the user's profile, or that may help tag this "Emotional Score" to the content that was watched. There could also be possible options to add comments besides recording the Emotional Score. The service could later have optional ability to semantically decode these comments based on Natural Language Processing to update the "Emotional Score".

Figure 8:
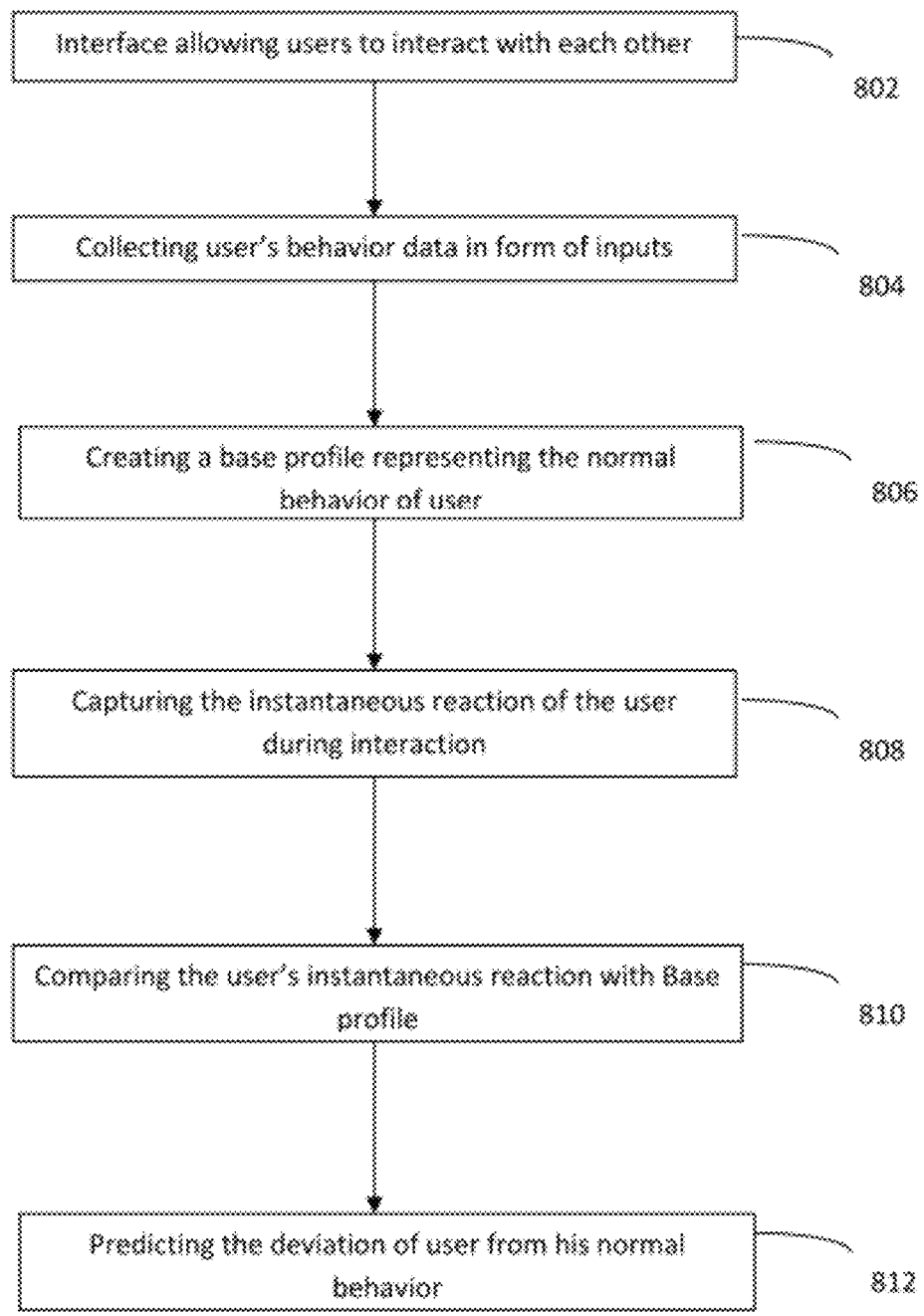
FIG. 8 illustrates a flow diagram depicting a process for deriving inference from analytics of personalized emotional profiles in accordance with an embodiment of the present invention.

FIG. 8 illustrates a flow diagram depicting a process for deriving inference from analytics of personalized emotional profiles in accordance with an embodiment of the present invention. In an embodiment, the method comprises following steps: 802: an interface that allows users to interact with each other. The interface includes a web conferencing service such as WebEx, GoToMeeting, or Skype. When the cloud based service for Emotional profile tracking is enabled, the service collects the data related to the behavior of users during conferencing applications as provided in step 804. The data is collected in form of video, voice, haptic, tactile, or other kind of data while the users are using the web conferencing application. The cloud based service builds a unique Emotional Profile of the users based on the continuous collection of data of various conversations that the users have over a course of time. A representation of the users 'baseline profile'(BP) that represents average emotional behaviors of the individuals in reaction to all possible 'events' that the users may come across is then created by the cloud based service as described in step 806. During each instantiation or conversation, the service collects the instantaneous reaction of users as shown in step 808. The users instantaneous reaction during every new conversation is compared with the Baseline Profile, as shown in step 810. The Baseline profile is then used to calculate deviations from the average behavior of the users during a course of conversation or to predict behavior of the individuals for an incoming online event based on some prior knowledge of the event, or to derive any similar analytics as shown in step 812.

In an embodiment of the present invention, the method to measure the deviation of EP score from the BP may be in different forms. These methods include but are not limited to a metric that measure loudness of voice during a conversation as measured by the client device; or a metric that measures the variation of user voice intonations during a conversation as measured by the client device; or a metric that measures the variation of user gestures during a conversation as measured by the client device; or variations of any other sensory input that may be captured and analyzed at the client device.

In another embodiment of the invention the Cloud Service collects all instances of the user's abnormal or deviant behavior and stores in a repository that could be accessed by the user. The Cloud Service may also be used to calculate informative analytics of these deviant behavior and use that to present it to the user, develop and modify the EP or BP of the user, or to derive other useful analytics that may be used by the user, or people in his network, or for other applications of the Cloud Service.

The personalized Emotional profile, Base Profile and the deviant behavior instances, and the related analytics developed in an interacting application may be used in various applications. For instance when a user views the content at a video repository such as Netflix, the cloud service's Netflix plug-in asks user to register users instantaneous profile manually, or by sample recording or a combination of both. The cloud service then compares the user instantaneous or time averaged profile over the period of time to the Emotional score or rating of the content available in video repository as rated by the other's user of the cloud service. The cloud service then recommends the best possible content (movie/TV show/game highlights) depending on the instantaneous or time averaged profile of the user.

The personalized Emotional profile, Base Profile and the deviant behavior instances, and the related analytics developed in an interacting application may also be used in various other applications like online gaming, online poker and other similar one-to-one or one-to-many interactive scenarios. In such applications the deviations from Base Profile of the user could be cues to certain actions that the user or other participants in the online game or poker could take advantage of, or could prompt the user or other users of the application to do certain actions in the application.

We claim:

1. A system for generating an emotional profile of a user while interacting with an online multimedia content or event, the system comprising:
    a client device having a detector to detect and capture auditory, visual or sensory inputs of the user in response to online events or content in a network;
    a processor configured to collect and process the auditory, visual or sensory inputs of the user to identify and generate emotional states of the user reflected from the user's sensory inputs;
    the processor configured to analyze emotional states of the user to determine an emotional state score of the user by calculating the intensity of each emotional component of the user at a given time stamp and normalizing the deviation of each generated emotional state score from an averaged or baseline emotional state score;
    a first module configured to tag the emotional states and the corresponding emotional state scores to the online multimedia content or events;
    generating the emotional profile for each of the user, where the emotional profile of the user contains the details of the online activities performed by the user, a list of online multimedia contents interacted by the user, the emotional state score of the user at different time stamps while interacting with the online multimedia content and the averaged or baseline emotional state score of the user, where the averaged or baseline emotional state score represents an average emotional behavior of the individual in reaction to all possible events that the user come across over a course of time.

2. The system of claim 1 wherein the client device is selected from a group consisting of a mobile phone, a Smartphone, a laptop, a camera with WiFi connectivity, a desktop, a tablet computer, or any other sensory device with connectivity.

3. The system of claim 1 wherein the detector captures the user's input in form of auditory, visual, sensory, haptic, tactile or other stimulus based signals that designate the emotions, or reaction of the user.

4. The system of claim 1 wherein the detector comprises facial expression detector, smile detector, voice intonation, tactile sensors, breath analysis, pulse detection or voice analysis.

5. The system of claim 1, wherein the emotional profile of the user is shared in the network based on a predefined set of rules.

6. The system of claim 1 wherein the emotional profile of the user is stored in different versions or formats at a repository and can be communicated to a plurality of client devices in the network.

7. The system of claim 1 where emotional state comprises sad, happy, angry, disgusted, normal, fearful and surprised.

8. A method for rating an online multimedia content or event comprising:
    distributing at least one online multimedia content or event to at least one client device using a web-based service over a connected network of client devices; capturing a user's auditory, visual or sensory input by a detector present in the client device, the user's inputs are captured in the form of a change in the user's reaction in response to the online multimedia content or event;
    providing a processing module configured for analyzing the user's auditory, visual or sensory input to identify emotional states of the user;
    determining emotional state score by calculating the intensity of each emotional component of the user at a given time stamp and normalizing the deviation of each generated emotional state score from an averaged or baseline emotional state score;
    generating an emotional profile of the user showing the user's activity in relation to the multimedia content including the list of multimedia content that have been interacted with, rating given to the multimedia content and the insight derived about the user form the rated multimedia content;
    wherein the online multimedia content are rated based on the generated emotional state score and tagged with the user's metadata and the emotional state of the user along with the emotional state score; and
    wherein the averaged or baseline emotional state score represents an average emotional behavior of the individual in reaction to all possible events that the user come across over a course of time.

9. The method of claim 8, wherein the online content or event is distributed among a plurality of the client devices configured with a server in the network through internet or Local Area Network.

10. The method of claim 8, wherein the user's input are in form of facial expressions, smile, voice intonations, tactile, breath analysis, pulse detection or voice analysis signals.

11. The method of claim 8 wherein the metadata provides link to the user information, content being watched, time the content was watched, and any other associated data linking the user, the content watched and the emotional score generated.

12. The method of claim 8 wherein the content or multimedia event is recommended to the user by analyzing the emotional score of the user, the user's networks, and the analytics associated with other similar content of a media repository.

13. The method of claim 8 wherein a user predicts the emotional score of other users in the network for a particular content and asks the other users to rate the content.

14. The method of claim 8 wherein a user invites other users or engages with other users in the network to get Emotional Scores of a specific content, to give Emotional Scores of specific content, or to gauge the performance of a particular content scored by a specific segment of the users.

15. The method of claim 8 wherein the emotional state comprises happy, sad, normal, disgusted, surprise, fearful and angry.

16. A method for deriving inferences from analytics of personalized emotional profile of a user in an interactive application comprising:
    providing a web-based service on a client device that enables user to interact with other users using at least one online multimedia content or event in a connected online infrastructure;
    capturing user's sensory, auditory or visual input during the interaction by a detector present in the client device;
    providing a processing module configured to process the user's sensory, auditory or visual input to derive emotional states of the user during interaction with the multimedia content;
    collecting the emotional states for a plurality of interactions with other users and with online multimedia content or event by a server and storing the emotional states in a database;
    processing the collected emotional states for the plurality of user interactions to generate a baseline profile representing average emotional behavior of the user in reaction to all experienced multimedia events and storing the baseline profile in the database;
    providing a mean to capture an instantaneous auditory, visual or sensory input of the user in a new interaction and deriving the instantaneous emotional states of the user during the entire interaction;
    comparing the instantaneous emotional state of user during the new interaction with the baseline profile;
    calculating the deviation of the user's emotional state during the new interaction with the average behavior of the user in the baseline profile; and
    determining the intensity of each emotional state component at a given time stamp and normalizing the deviation of the emotional state from the baseline profile to determine an emotional state score at the given time stamp.

17. The method of claim 16 wherein the web-based service comprises an on-line conversation service, web conferencing, online advertisements and online videos.

18. The method of claim 16 wherein the deviation of the user's emotional state is measured by a metric that measure variation of voice, video, haptic, gesture, tactile or other sensory inputs with the baseline profile.

19. The method of claim 16 wherein the deviation of the user from the baseline profile is used in gaming, conferencing and other online applications to predict the reaction of the user.

20. The method of claim 16 wherein the emotional state comprises sad, happy, normal, angry, disgusted, fearful and surprise.

* * * * *